Aug. 12, 1930.  W. E. STEINWEDELL  1,772,789
APPARATUS FOR MANUFACTURING WATER GAS
Filed Feb. 15, 1928
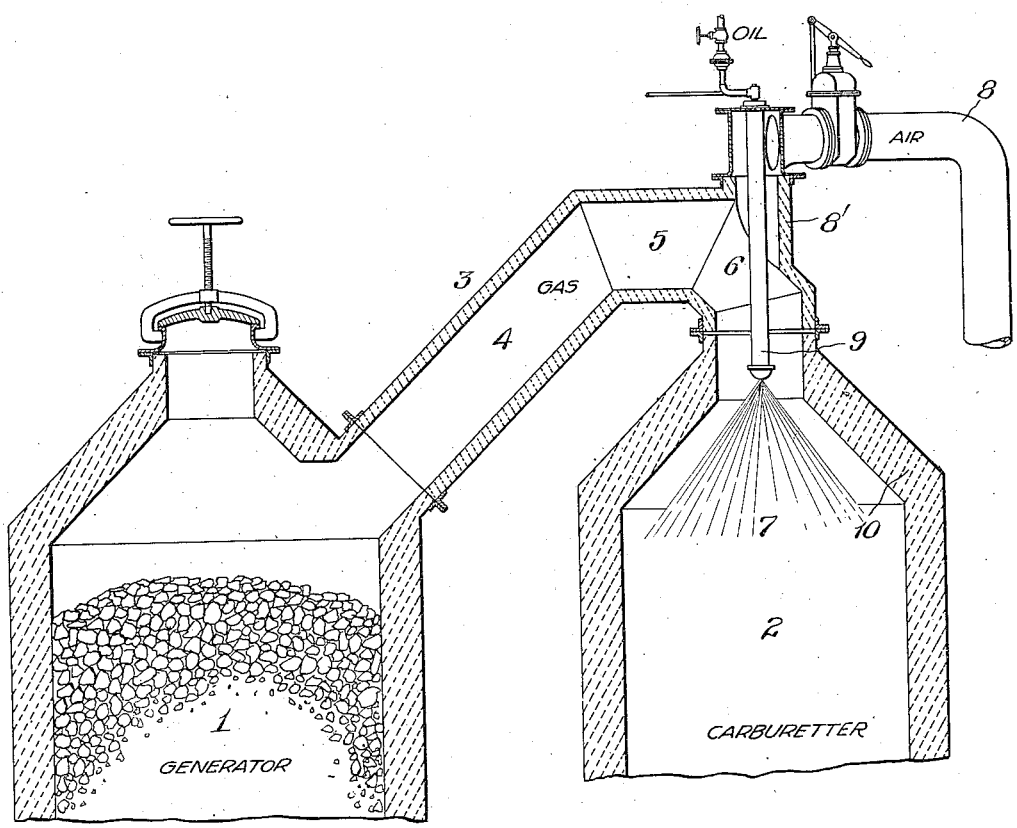
INVENTOR:
WILLIAM E. STEINWEDELL
BY George W. Saywell
ATTORNEY Patented Aug. 12, 1930

1,772,789

UNITED STATES PATENT OFFICE

WILLIAM E. STEINWEDELL, OF CLEVELAND HEIGHTS, OHIO, ASSIGNOR TO THE GAS MACHINERY COMPANY, OF CLEVELAND, OHIO, A CORPORATION OF OHIO

APPARATUS FOR MANUFACTURING WATER GAS

Application filed February 15, 1928. Serial No. 254,353.

My invention relates to apparatus for manufacturing water gas. The improvements are adaptable to water gas apparatus, either in connection with the carbureting step ordinarily practiced in a carbureting chamber for enriching the blue water gas, or in apparatus in which the carbureting step is omitted and in which the chamber is contained within an igniter and is intended only for mixing air with the blue water gas. In the detailed description hereinafter contained and in the embodiment of the invention shown in the accompanying drawing, I have illustrated the invention in connection with a carburetter, and in the claims of this application I have set forth an assembly of water gas apparatus in which the carburetter is included. The invention particularly relates to improvements in apparatus of this character by means of which a uniform heating of the lining of the carburetter is obtained; as also a uniform heating of the checker brick with which the carburetter is usually filled, particularly obviating excessive burning or deterioration of the lining in certain sections of the carburetter. Damage of the character noted which it is intended by this invention to avoid has been caused by the lateral feeding of the gas from the generator into the carburetter, this lateral feeding of the gas which has usually taken place in an upper portion of the carburetter, causing the gas to shoot across the carburetting chamber against the lining of the opposite wall subjecting the latter to excessive heat and unduly rapid deterioration. I obviate this difficulty by providing a gas duct from the generator to the carburetter which enters the top of the latter and directs the gas vertically downwardly into the checker work. Preferably this gas duct centrally enters the top of the carburetting chamber and directs the gas downwardly symmetrically relatively to the axial line of the carburetter.

These improvements are of a nature, relative to the gas feed, analogous to those shown in United States Patent No. 892,548 of July 7, 1908, granted to Pierre Plantinga upon Improvements in apparatus for manufacturing water gas in which, in order to obviate an unequal heating of the carburetter checker work and also to obviate the burning off of the end of the oil spray nozzle, the secondary air furnished the carburetter during the preliminary heating operation is supplied to the carburetting chamber centrally of the top of the latter and is directed downwardly into the carburetter chamber, instead of entering the carburetter chamber from the side as heretofore practiced. In the above-mentioned patent the oil spraying device is located within the air duct. In the present invention I have modified and adapted the improvements of said patent to cooperate with the improvements herein described and claimed.

The annexed drawing and the following description set forth in detail certain means embodying my invention, such disclosed means constituting, however, but one of the forms in which the principle of my invention may be embodied.

This annexed drawing is a fragmentary vertical axial section of apparatus for manufacturing water gas in which my improvements are embodied, the particular embodiment therein shown being that of the use of the invention with a carburetter.

Referring to the annexed drawing, a water gas generator shell 1 is connected to a separate carburetter shell 2 by means of a gas duct 3 which takes off from the top of the generator 1 and is comprised of an upwardly-inclined section 4, a horizontal section 5, in the form of device shown, and a downwardly-inclined section 6 adapted to enter the top of the carburetter 2, this gas duct section 6 centrally entering the top of the carburetter 2. The usual blast air and steam connections to the generator 1 are not shown in the fragmentary section of apparatus illustrated. A secondary blasting air duct 8 centrally communicates with the gas duct section 6 immediately above the top of the carburetter 2, this air duct 8 also communicating with the gas duct portion 6 symmetrically centrally of the carburetter 2. This air duct 8 supplies blasting air to the carburetter 2 during the preliminary air blasting or heating period. As is well known to those skilled in the art, the water gas is enriched by oil supplied thereto within the carburetter during a stage of the operation subsequent to the preliminary heating step. The spray nozzle 9 shown herein for furnishing the oil enters the carbureting chamber 7 through the gas duct section 6, being centrally located within the gas section 6 and within the air duct section 8'. In so far as the location of the oil spray nozzle 9 is concerned, this disposition of the parts permits proper distribution of the oil and at the same time the end of the nozzle 9 cannot burn off during the "blow", when the air keeps it cool, nor during the "steam run" when the oil is being fed therethrough. If the invention were used in connection with the operation of an ordinary igniter, the carbureting step would be omitted and the water gas duct would enter vertically into the top of the igniting chamber and direct the gas downwardly therein to be mixed with air separately conducted into the igniting chamber. This last-mentioned form of the invention is not herein claimed. The improvements herein shown, by causing the gas centrally to enter the top of the carburetter 7, discharge the gas uniformly into the latter and downwardly, thus equally distributing the heat of the gas upon all parts of the lining 10 and protecting each part of the same from any direct impinging of the gas and from deterioration to an extent greater than that to which other parts of the lining are subjected.

The described apparatus also provides for a thorough mixing of the generator air blast gas and the carburetor air blast before these gases reach the combustion chamber of the carburetor 2. Also, the hot blue water gas coming from the generator during the steam run envelops the oil and thoroughly vaporizes the latter. An even distribution and gasification of the vaporized oil over the carburetor checker brick is effected by the uniform, centralized downward flow of the oil and the blue water gas from the generator, instead of that condition in which the oil and blue water gas are thrown against one side wall of the carburetor, as happened in former practice when the blue water gas from the generator was admitted at one side of the carburetor and the oil came in through the top of the carburetor. Furthermore, the oil results are improved and there is a reduction in maintenance.

What I claim is:

1. Apparatus for manufacturing water-gas comprising a generator shell; a separate carburetter shell; a single duct leading from the generator to the carburetter, said duct opening into the top of the carburetter and having the axis of its opening in parallelism with the axis of the carburetter; and means for supplying oil to the carburetter, the oil-supplying means extending through said duct opening and discharging downwardly into the carburetter.

2. Apparatus for manufacturing water-gas comprising a generator shell; a separate carburetter shell; a single duct leading from the generator to the carburetter, said duct opening into the top of the carburetter and having its opening coaxial with the carburetter; and a duct for supplying oil to the carburetter, the oil-supplying duct being coaxial with the opening of said first-mentioned duct and discharging downwardly into the carburetter.

3. Apparatus for manufacturing water-gas comprising a generator shell; a separate carburetter shell; a duct leading from said generator to said carburetter, said duct opening into the top of said carburetter and discharging vertically downwardly thereinto; a valve-controlled duct for supplying blast air to the carburetter, the air entering the carburetter within said first-mentioned duct; and valve-controlled means for supplying oil to the carburetter, said oil-supplying means being located within said first-mentioned duct.

4. Apparatus for manufacturing water-gas comprising a generator shell; a separate carburetter shell; a duct leading from said generator to said carburetter, said duct opening centrally into the top of said carburetter and discharging downwardly thereinto; a valve-controlled duct for supplying blast air to the carburetter, said air duct centrally vertically entering that part of the first-mentioned duct immediately above the carburetter; and a valve-controlled duct for supplying oil to the carburetter, said oil duct being located within the first-mentioned duct and entering said first-mentioned duct centrally of the air duct.

Signed by me this 1st day of February, 1928.

WILLIAM E. STEINWEDELL.